Patented Sept. 15, 1936

2,054,780

UNITED STATES PATENT OFFICE 2,054,780

PROCESS OF PRODUCING RUBBER ARTICLES

Rudolph S. Bley, Elizabethton, Tenn., assignor to North American Rayon Corporation, New York, N. Y., a corporation of Delaware No Drawing. Application April 3, 1935, Serial No. 14,469

1 Claim. (Cl. 91—68)

The present invention relates to a process of producing reinforced vulcanized rubber articles.

The principal object of this invention has to do with the incorporation of desulphurized but unbleached rayon yarns and fabrics into rubber before the vulcanization thereof.

Other objects of this invention will become apparent to those skilled in the art from a study of the following specification.

I am well aware that it has, heretofore, been proposed to replace cotton fabrics by rayon fabrics in vulcanized rubber articles, and that undesulphurized rayon has been used for this purpose. U. S. Patent 1,902,871 to George R. Lockhart of March 28, 1933, for example, discloses a vulcanized rubber article containing undesulphurized rayon. Contrary to the allegation that the sulphur particles present in undesulphurized rayon filaments and yarns assist vulcanization and promote adherence of the rayon to the surrounding rubber mass, I have found that the sulphur does not exert this beneficial assistance but, on the contrary, induces a weakening of the cellulose when the rubber containing undesulphurized rayon is heated to vulcanization temperature. In my opinion, the detrimental effect of sulphur, present in undesulphurized rayon, is to be explained by the fact that cellulose forms at vulcanization temperature hydrogen sulphide with sulphur (vide U. S. patents, Numbers 1,992,895 and 1,992,896, of February 26, 1935, granted to R. S. Bley). The hydrogen sulphide formed does not only fail to promote vulcanization of the rubber, but it tends to loosen the cellulose from the surrounding rubber.

I have, furthermore, found that ordinary desulphurized and bleached rayon, heretofore conventionally used in combination with rubber, does not yield a satisfactory product for the reason that the small residues of bleaching agents remaining in the regenerated cellulose, such as viscose, tend to oxidize rubber. Since it is a well-known fact that rubber is decomposed, or aged, rapidly in the presence of oxidizing agents, it is necessary to add anti-oxidants to rubber compositions. For this reason the imbedding of bleached rayon is detrimental to the keeping qualities of vulcanized rubber products. These deficiencies of either undesulphurized or desulphurized, bleached rayon may be overcome by using desulphurized but unbleached viscose silk. Any type of viscose rayon may be used in combination with suitable rubber compositions provided it is thoroughly desulphurized and unbleached. This rayon may be used either in the form of yarns or fabrics to satisfactorily replace cotton heretofore used in the rubber art. By imbedding the rayon in rubber, it may be impregnated with suitable accelerators, thin rubber solutions with or without addition of vulcanizing agents, etc. In addition, to promote adherence of the viscose rayon to rubber, it may be roughened by suitable means. I wish to emphasize that the use of desulphurized, unbleached viscose rayon in vulcanized rubber products is not only economical, but that it eliminates the impregnation of regenerated cellulose with formaldehyde, necessary to counteract the destructive action of sulphur upon cellulose, as disclosed in the patent to Lockhart, set forth above.

Modifications of my invention will be readily recognized by those skilled in the art, and I wish to include all such modifications falling within the scope of the appended claim.

I claim:

An article of manufacture consisting of vulcanized rubber having imbedded therein strengthening threads of desulphurized, unbleached rayon.

RUDOLPH S. BLEY.